United States Patent
Dettenberger et al.

(10) Patent No.: US 9,209,660 B2
(45) Date of Patent: Dec. 8, 2015

(54) ELECTRIC-MOTOR BRAKE ACTUATOR OF A MOTOR VEHICLE PARKING BRAKE

(71) Applicant: OECHSLER AKTIENGESELLSCHAFT, Ansbach (DE)

(72) Inventors: Stefan Dettenberger, Ansbach (DE); Michael Traeger, Heilsbronn (DE); Martin Assel, Burgbernheim (DE)

(73) Assignee: Oechsler Aktiengesellschaft, Ansbach (DE)

( * ) Notice: Subject to any disclaimer, the term of this patent is extended or adjusted under 35 U.S.C. 154(b) by 0 days.

(21) Appl. No.: 14/356,935

(22) PCT Filed: Dec. 13, 2012

(86) PCT No.: PCT/EP2012/005147
§ 371 (c)(1),
(2) Date: May 8, 2014

(87) PCT Pub. No.: WO2013/087209
PCT Pub. Date: Jun. 20, 2013

(65) Prior Publication Data
US 2014/0312720 A1    Oct. 23, 2014

(30) Foreign Application Priority Data
Dec. 16, 2011   (DE) .................. 10 2011 121 177

(51) Int. Cl.
*H02K 5/15*         (2006.01)
*F16D 65/18*        (2006.01)
(Continued)

(52) U.S. Cl.
CPC *H02K 5/15* (2013.01); *F16D 65/18* (2013.01); *H02K 1/2706* (2013.01); *H02K 15/14* (2013.01); *F16D 2121/24* (2013.01); *F16D 2125/48* (2013.01); *Y10T 29/49012* (2015.01)

(58) Field of Classification Search
CPC ........... H02K 1/27; H02K 5/15; H02K 15/14; H02K 7/102; H02K 7/1025
USPC .................................................. 310/92, 93, 77
See application file for complete search history.

(56) References Cited

U.S. PATENT DOCUMENTS 3,772,546 A     11/1973 Means
4,713,567 A *   12/1987 Fey et al. .................. 310/105
(Continued)

FOREIGN PATENT DOCUMENTS

DE     19748318 C1    5/1999
DE     19955080 A1 *  5/2001 ............ F16D 65/14
(Continued)

OTHER PUBLICATIONS

Machine translation of DE1995080, Weiler et al., Electromechanical operating system motor vehicle parking brake operated includes electric motor and threaded driving mechanism, May 2001, ALL.*

*Primary Examiner* — Naishadh Desai
(74) *Attorney, Agent, or Firm* — Laurence Greenberg; Werner Stemer; Ralph Locher

(57) ABSTRACT

A particularly cost-effective electric-motor brake actuator which is useable in a highly flexible manner in respect of structural boundary conditions has an integrally formed cup which is equipped with a permanent magnet assembly and can be equipped with a separately manufactured, electromagnetic rotor assembly. In this manner, the equipment outlay is reduced as is the construction costs.

8 Claims, 1 Drawing Sheet

(51) Int. Cl.
  *H02K 1/27* (2006.01)
  *H02K 15/14* (2006.01)
  *F16D 121/24* (2012.01)
  *F16D 125/48* (2012.01)

(56) References Cited

U.S. PATENT DOCUMENTS

| | | |
|---|---|---|
| 5,268,607 A | 12/1993 | McManus |
| 6,431,330 B1 | 8/2002 | Poertzgen et al. |
| 6,522,042 B1 | 2/2003 | Du et al. |
| 6,617,746 B1 | 9/2003 | Maslov et al. |
| 6,982,511 B2 | 1/2006 | Oender et al. |
| 7,119,469 B2 | 10/2006 | Ortt et al. |
| 8,105,200 B2 | 1/2012 | Dettenberger et al. |
| 2001/0010440 A1 | 8/2001 | Ortt |
| 2003/0102749 A1 | 6/2003 | Kuch et al. |
| 2004/0108782 A1* | 6/2004 | Enomto et al. ............ 310/156.43 |
| 2008/0293534 A1* | 11/2008 | Dettenberger et al. ....... 475/154 |
| 2009/0200882 A1* | 8/2009 | Berdut-Teruel ................. 310/90 |

FOREIGN PATENT DOCUMENTS

| | | |
|---|---|---|
| DE | 10054938 A1 | 5/2002 |
| DE | 10064803 C1 | 12/2002 |
| DE | 10354969 A1 | 6/2004 |
| DE | 102006050166 A1 | 4/2008 |
| DE | 102009046044 A1 | 5/2010 |
| DE | 102011121177 A1 | 6/2013 |
| WO | 2006094804 A1 | 9/2006 |

* cited by examiner

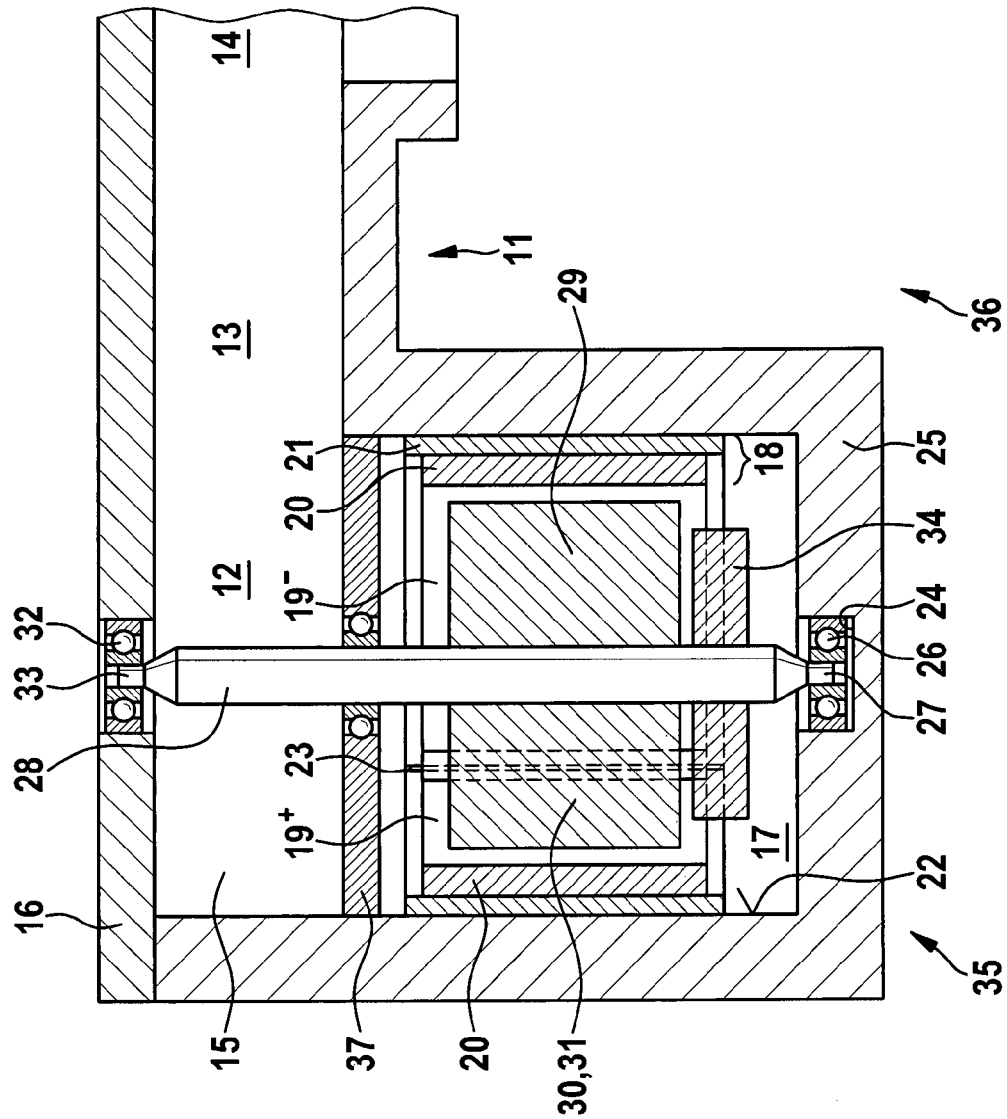

ELECTRIC-MOTOR BRAKE ACTUATOR OF A MOTOR VEHICLE PARKING BRAKE

BACKGROUND OF THE INVENTION

Field of the Invention

The invention relates to the electric-motor brake actuator of a motor vehicle parking brake.

In order to be able to use a structurally small, high speed production motor that has a correspondingly small torque, the actuator is equipped with a high-ratio reduction gear for actuating the brake. DE 1 97 48 318 C1 discloses for this purpose a two stage gear train in which the first reduction stage is provided as a toothed belt transmission between the motor and a second reduction stage in the form of an extremely high-ratio, self-locking shaft gear or squash plate mechanism for correspondingly greatly increasing the output torque at the actuator output. It is of advantage that the belt drive is as a reduction stage in the actuator because the motor axis and the transmission axis can be arranged parallel to one another, which produces an overall compact construction. Fundamentally, however, a construction of this type can also be achieved by means of a multi-stage conventional gear mechanism. A spindle is connected to the output shaft of a gear motor actuator of this type for the purpose of adjusting the mechanical brake system in a self-locking manner (namely for applying or releasing said mechanical brake system).

It is known from DE 1 00 64 803 C1 to install the fully functional motor, which is encapsulated in a housing, in a receiving device, which tapers in a slightly conical manner, in the actuator and to lock said motor in a non-positive manner or preferably a positive manner to prevent said motor from turning.

The construction of a motor of this type is described for instance in U.S. Pat. No. 6,982,511 B2. A shaft stub of the rotor shaft is initially equipped in an axial manner with a bearing supporting ring and then with a ball bearing. The rotor that is equipped in this manner is lowered, with the ball bearing first, in an axial manner into a hollow cylindrical motor housing and in so doing the ball bearing is installed in a receiving device in the housing base. A pole sleeve that is equipped inside with stator magnets is pressed between the rotor and the housing wall in an axial manner into the housing. A longitudinal slit in the sleeve to provide said sleeve with radial elasticity is explicitly rejected because the assembly process of said sleeve would then be too complicated and the magnetic flux guide would be interrupted. The ball bearing is fixed in an axial manner at the housing base by virtue of the fact that the end face of the sleeve rests against the bearing supporting ring. Barbed hooks that are pushed out of the outer wall of the sleeve in a radial manner clamp the sleeve in the motor housing and as a measure to prevent said sleeve from being withdrawn from said housing engage into the inner wall of the motor housing, which in contrast is made from a soft material. The self-contained motor is complete and can now be installed in a conventional manner for instance into an actuating drive, in particular for auxiliary equipment in motor vehicles. This applies accordingly for the small motor previously known from DE 10 2006 050 166 A1 that comprises a stator sleeve for receiving the rotor, wherein the stator sleeve is made from a magnetically soft sintered material and its inner wall is equipped with a pair of mutually diametrically opposite-lying permanent magnets having a different polarity and being made from a magnetically hard sintered material. The rotor bearing is also received in the base of a motor housing that is closed in a cup-shaped manner at one end and is also used in this case as the stator; as a result of which the motor is completely self-contained ready for installation. According to DE 1 03 54 969 A1, a previously completed small motor is installed in the transmission housing of a piece of equipment. Once the electromagnetic rotor has been accommodated in the sleeve-shaped motor housing of said small motor, the two end faces of said sleeve-shaped motor housing are equipped with bearing shields for the rotor shaft. A radially expandable flux ring that is equipped on its inner wall with magnets rests against the housing inner wall. This group of permanent magnets, flux ring and motor housing is encased by means of injection-molded synthetic material for the purpose of mechanically fixing said parts with respect to one another. Whereas the rotor shaft is equipped on the output side upstream of the bearing shield with a toothed wheel, the rearward shaft stub supports upstream of its bearing shield a brush commutator that is not further disclosed with respect to details. In the case of a similar motor installation in accordance with U.S. Pat. No. 6,522,042 B1, stator permanent magnets are integrally cast on a ring using an injection-molding process and in so doing are anchored in a positive-locking manner in profiles that are formed from the ring. According to U.S. Pat. No. 5,268,607, the cup-shaped motor housing is spray-coated with glass-fiber-reinforced and mineral-filled synthetic material in the case of a bearing seat that is formed downstream of the cup base; with a flux ring that is injection-molded onto the cup inner wall and two half shell-shaped permanent magnets are mounted in said flux ring. This self-contained motor can be lowered into the support plate of transmission housing for a vehicle windscreen wiper and can subsequently be screwed to diametrically protruding holed ear-shaped flanges. The hermetically-housed direct current motor according to U.S. Pat. No. 3,772,546 having a permanent magnetic stator is likewise equipped on the output side with a brush commutator.

In contrast thereto, U.S. Pat. No. 6,0617,746 B1 describes for a motor stator radially and axially mutually offset electromagnets having coil cores and pole shoes that are formed from magnetically soft powder.

BRIEF SUMMARY OF THE INVENTION

The two motor types referred to above can be installed as self-contained small motors in each case in the receiving chamber in the previously mentioned injection-molded housing and can be connected by means of a belt drive or toothed wheel to the reduction gear that is likewise mounted in this actuator housing. In contrast thereto, the object of the present invention is to solve the technical problem of reducing the equipment outlay and as a consequence also the costs for the construction of an electric-motor brake actuator that is to be equipped with a motor.

This object is achieved in accordance with the essential features disclosed in the main claim. Accordingly, a fully functional motor is no longer installed in a neutral housing receiving device for the purpose of constructing the actuator; but rather in this case only a separately produced and delivered rotor is installed in a cup that is embodied in a housing part and has been equipped in advance with a magnet assembly. A magnet assembly of this type comprises (at least) two hollow cylindrical shells made from a permanent magnetic material that has a peripheral alternating polarity, wherein it is preferred that the shells are made from injection-molded sintered magnets. Said hollow cylindrical shells can be held radially outside a sleeve-shaped sheet metal ferromagnetic flux guide but are preferably arranged radially inside the sheet metal flux guide. This hollow cylindrical sheet metal flux guide is provided in an expedient manner with slits over at least a part of its axis-parallel length along a generating in order to be able to install said sheet metal flux guide in the cup more easily, namely with less resilient elastic radial compression, in that the sheet metal flux guide relaxes in such a manner that its diameter increases and as a consequence it is held radially on the inner peripheral surface of the cup in a non-positive manner or by means of a material connection, namely fixedly clamped or preferably fixedly adhered thereto.

The adjacent end face of the motor shaft is mounted on the cup base. The mounting can be performed in a simply designed bearing shield that is inserted in or placed on the region of the cup opening which can be mounted axially opposite. As an alternative or in addition thereto, the rotor shaft can also be mounted opposite the cup base outside the cup, namely in a separate, vibration-damped bearing bridge that is held by the housing, or also directly in the housing cover or transmission cover lying opposite.

In any event, it is then expedient for a direct current motor operation if the mentioned bearing shield is omitted in order to arrange the electromechanical or sensor-controlled electronic commutators towards the cup base.

Additional modifications and further alternatives within the scope of the present invention are evident in the further claims and, also with respect to their advantages, in the description herein under of a preferred embodiment for achieving the object in accordance with the invention, said exemplified embodiment being illustrated greatly enlarged and not true to scale whilst being limited to the essential functions of the invention.

BRIEF DESCRIPTION OF THE SEVERAL VIEWS OF THE DRAWING

The single FIGURE of the drawing illustrates in a sectional view a construction in accordance with the invention of an actuator of the generic type in the axial longitudinal sectional view but without technical details relating to the transmission and without taking into consideration the electrical connections.

DESCRIPTION OF THE INVENTION

It is possible in the sectional illustration of the housing part 11 that is part of a brake actuator 36 and can be produced from injection-molded synthetic material to roughly distinguish successive parts from one another: a drive region 12, a transmission region 13 and an output region 14 that is connected to the mentioned actuating spindle for the purpose of actuating the brake. The motor shaft and wheel shaft are mounted in a gear box 15. A bearing bridge can be installed for this purpose in said gear box in a vibration-damping and consequently noise-damping manner; for the purpose of simplifying the illustration, one bearing is illustrated in the housing cover 16 as is evident in detail by way of example in WO 2006/094804 A1.

In place of the self-contained fully functional small motor that is conventionally installed in the actuator housing part 11, a cup 17 that is open towards the housing cover 16 is provided in this case in the housing part 11. A permanent magnetic magnet assembly 18 is installed in this cup 17 in a sleeve-shaped coaxial manner. Said assembly provides on the periphery, in the circumferential direction, a sequence of (at least two) alternating magnetic poles 19 (in this case 19+ and 19−). The poles 19 are preferably illustrated by corresponding multiple permanent magnetic elements 20 (in this case two such elements are arranged diametrically opposite one another with respect to the middle axis of the cup 17, spaced apart from one another on the periphery and as a consequence following one another with spaces in between). Elements 20 of this type are preferably injection-molded sintered magnets in the form of shells that have for instance a hollow cylindrical shape. Said shells are expediently provided at the rear with a sheet metal ferromagnetic flux guide 21 that as illustrated is in the form of a circumferential band. Said sheet metal flux guide can be supported under radially resilient elastic stress lying against the inner peripheral surface 22 of the cup 17. The per se annular closed sheet metal flux guide 21 can comprise for this purpose a particularly axis-parallel longitudinal slit 23 so that said sheet metal flux guide can be by way of example manually radially compressed for the purpose of being inserted into the cup 17; the said elements 20 are fixed on the inner periphery of the per se annular closed sheet metal flux guide 21 in a positive locking manner or by means of a material connection. This causes elastic flexural loadings of the sheet metal flux guide 21 to occur between mutually adjacent elements 20, said loadings being sufficient to expand said sheet metal flux guide radially outwards as it relaxes after being inserted into the cup 17 and as a consequence to relax in any case slightly against the inner peripheral surface 22 of said cup. In an expedient manner, the sheet metal flux guide 21 becomes adhered to the inner peripheral surface 22 of the cup 17; for which purpose it is useful to exert temporary additional pressure on the elements 20 in the centrifugal direction.

A central blind hole 24 at the, preferably in the, cup base 25 is equipped with a bearing 26 for the purpose of receiving the lower free end face 27 of a coaxial shaft 28. Said coaxial shaft is a component of an externally pre-assembled electromagnetic rotor assembly 29 having armature arms 30 and their magnetic coils 31. The upper region, or rather possibly the end face 33, of the shaft 28 is received by a bearing 32 on the actuator cover 16 in the case of a separate, in contrast offset, bearing bridge (not illustrated) and/or on a bearing shield 37, (said upper region being the region that lies axially opposite the lower region).

Conventionally, sensors or rather the collector brush arrangements for electronic or electromechanical commutation where the motor is operating with direct current are arranged on the output side (i.e. lying at the top in the drawing), namely in part rotor-fixed and in the other part stator-fixed for instance on a bearing shield 37 in the opening plane of the cup 17. In particular, if a bearing shield 37 is not installed within the scope of the present invention, a commutation device of this type is expediently arranged as a pre-assembled commutator assembly 34 in the inside towards the base 25 of the cup 17, as schematically considered in the drawing. The stationary part of the commutator assembly 34 can latch in a non-rotatable manner as it is being inserted into the cup 17.

A particularly cost-effective gear-driven brake actuator 36 that can also be used in a highly flexible manner in respect of structural boundary conditions therefore comprises an electric-motor drive, whose stator magnet assembly 18 together with, if necessary, the commutator assembly 34 is lowered, in particular latched or adhered, directly into an actuator cup 15 to form an integral component of an actuator housing 11. The cup 15 can be equipped with an externally assembled rotor assembly 29. Bearings 32 for the drive shaft and transmission shaft 28 can be provided, apart from in the housing part 11 itself, in a bearing bridge that is mounted in or on the housing part 11 in a vibration-damped and consequently noise-damped manner.

LIST OF REFERENCE NUMERALS

11 Housing part (of 36)
12 Drive region (of 11)
13 Transmission region (of 11)
14 Output region (of 11)
15 Gear box (of 11)
16 Cover (of 11/15)
17 Cup (on 15)
18 Magnet assembly (in 17)
19 Magnet poles (10+, 19−; of 20)
20 Permanent magnetic elements (of 18)
21 Sheet metal flux guide (of 18 between 20 and 22)
22 Inner peripheral surface (of 17)
23 Longitudinal slit (in 21)
24 Blind hole (in 25)
25 Base (of 17)
26 Bearing (on or in 24)
27 Lower end face (of 28 in 26)
28 Shaft (of 29)
29 Rotor assembly (inside 20)
30 Armature arm (of 29 on 28; not illustrated in the drawing)
31 Magnetic coils (on 30, not illustrated in the drawing)
32 Bearing (in or on 16, for 33)
33 Upper end face (of 28, in 32)
34 Commutator assembly (below 37 or below 29)
35 Motor (comprising 18+29+34+possibly 37)
36 Actuator (with 11 and 35)
37 Bearing shield (for 28 in 17)

The invention claimed is:

1. An electric-motor actuator, comprising:
a cover;
a housing part produced from an injection-molded synthetic material and having a drive region, a transmission region, an output region, and a cup provided in said drive region, said cup opening towards said cover and having an inner peripheral surface and a cup base;
a gear box disposed in said housing part;
wheel shafts mounted in a case of a two-sided bearing configuration on one side in said gear box and on the other side in said cover;
a permanent magnet assembly held on said inner peripheral surface in a sleeve-shaped manner, said permanent magnet assembly having at least two permanent magnetic elements of alternating polarity of magnetic poles, said permanent magnetic elements being disposed adjacent to one another spaced apart on a periphery, said permanent magnet assembly further having a sheet metal ferromagnetic flux guide, said permanent magnetic elements are provided at a rear with said sheet metal ferromagnetic flux guide; and
an electromagnetic rotor assembly disposed in said permanent magnet assembly and mounted on said cup base, said electromagnetic rotor assembly having a shaft with an upper end face lying opposite a lower end face, said electromagnetic rotor assembly inserted in a coaxial manner by said upper face end of said shaft being received outside said cup in said cover.

2. The actuator according to claim 1, wherein said electromagnetic rotor assembly has in a vicinity of said cup base a commutator assembly.

3. The actuator according to claim 1,
wherein said cup has a cup opening formed therein and axially opposite said cup base; and
further comprising a bearing shield, said electromagnetic rotor assembly is mounted in said bearing shield in a region of said cup opening.

4. The actuator according to claim 1, wherein said permanent magnetic elements are injection-molded sintered shells.

5. The actuator according to claim 1, wherein said permanent magnetic elements are fastened to said sheet metal ferromagnetic flux guide in a form-locking manner or by means of a material connection.

6. The actuator according to claim 1, wherein said sheet metal ferromagnetic flux guide is supported against said inner peripheral surface of said cup in a radially resilient elastic manner and is connected thereto by means of a material.

7. The actuator according to claim 1, wherein said sheet metal ferromagnetic flux guide has an axis-parallel longitudinal slit formed therein.

8. The actuator according to claim 1, further comprising:
a bearing shield; and
a commutator assembly disposed on said bearing shield in a region of an opening plane of said cup.

* * * * *